R. H. YALE.
LUBRICATOR.
APPLICATION FILED FEB. 13, 1920.
1,406,320. Patented Feb. 14, 1922.
2 SHEETS—SHEET 2.
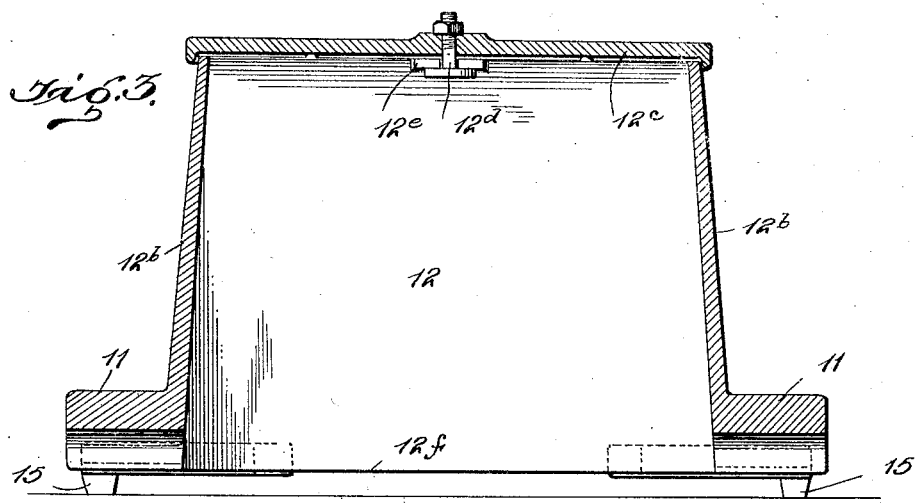
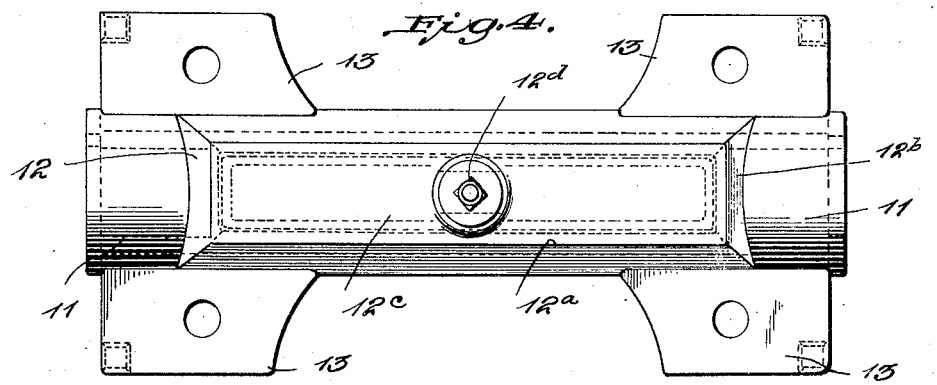
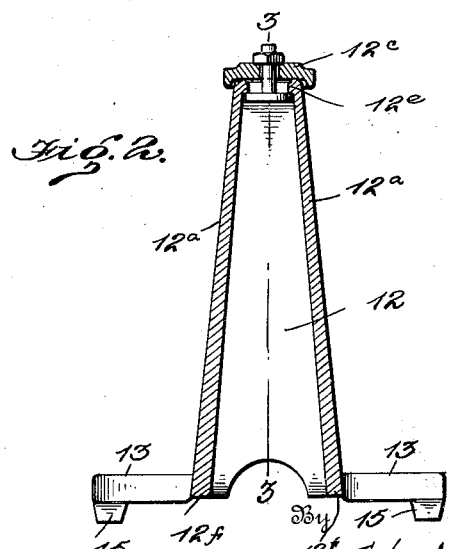
Inventor
R. H. Yale
By Hubert E. Vick, Attorney

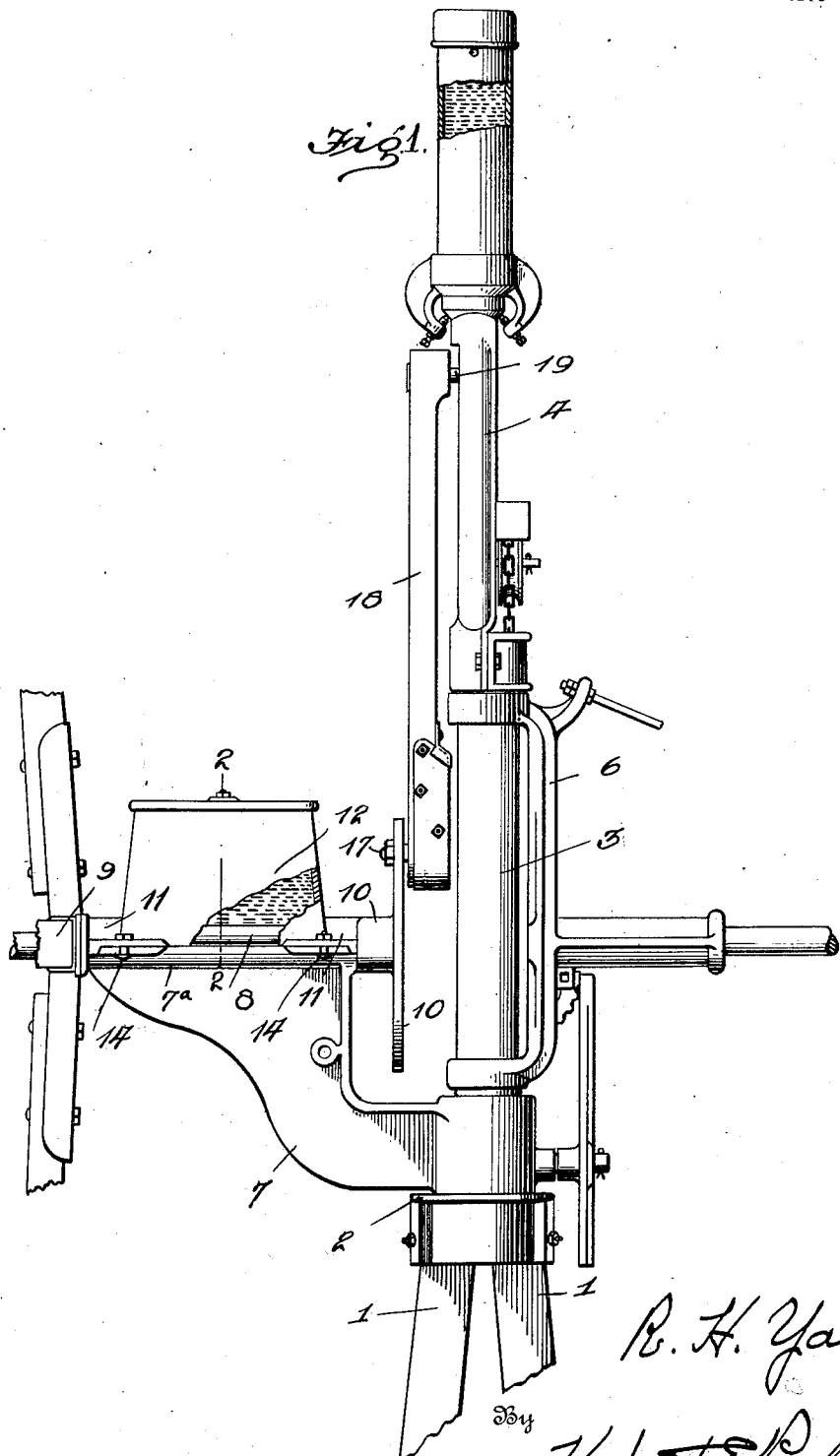

UNITED STATES PATENT OFFICE.

RODNEY H. YALE, OF LINCOLN, NEBRASKA, ASSIGNOR TO YALE AND HOPEWELL COMPANY, OF LINCOLN, NEBRASKA, A CORPORATION OF NEBRASKA.

LUBRICATOR.

1,406,320.  Specification of Letters Patent.  Patented Feb. 14, 1922.

Application filed February 13, 1920. Serial No. 358,386.

*To all whom it may concern:*

Be it known that I, RODNEY H. YALE, a citizen of the United States of America, and resident of Lincoln, Lancaster County, State of Nebraska, have invented certain new and useful Improvements in and Relating to Lubricators, of which the following is a specification.

This invention relates to certain improvements in lubricators for windmills and other machinery; and the objects and nature of the invention will be readily understood by those skilled in the art in the light of the following explanation of the accompanying drawings illustrating what I now believe to be the preferred mechanical expression or embodiment of my invention from among other forms, constructions and arrangements within the spirit and scope thereof.

The lubricator of my invention is characterized by the provision of means to contain or hold a large body or mass of grease (heavy viscous lubricant) that will supply lubricant for the bearing to be served during a long period of time without recharging, inspection or attention, and to maintain the mass of grease in extensive direct contact with the moving part whose bearing is to be lubricated, in such manner that the movement of said part in the grease will cause delivery of grease from the mass to the bearing only in the restricted limited quantity needed for lubrication without such excess as to cause passage of worn or gritty grease from the bearing back to the mass, and to require free downward movement or settling of the mass of grease (under the action of gravity or of gravity aided by atmospheric pressure) to maintain its extensive contact with the moving part, as the movement of said part gradually reduces the mass by removal of grease from the bottom portion thereof.

With these and other objects in view, in whole or in part, the invention consists in certain novel features in construction or in combinations and arrangements as more fully and particularly set forth and specified hereinafter.

Referring to the accompanying drawings:—

Fig. 1, is an elevation showing in part a windmill head equipped with a lubricator embodying my invention.

Fig. 2, is a section taken on the line 2—2, Fig. 1.

Fig. 3, is a longitudinal section taken on the line 3—3, Fig. 2.

Fig. 4, is a detail top plan view.

In the particular example illustrated for purposes of explanation, I show the upper part of a windmill tower or other suitable supporting frame 1 carrying the base 2 on which the windmill head or turn-table is mounted, in any suitable or usual manner.

The windmill head or turntable is of any suitable or usual construction, except in so far as the same may be modified to include the lubricators, and in the form adopted for illustration, said head embodies a vertical tubular portion 3 providing an upper vertical vertically elongated casting or other member 4 forming a guide or slideway for the vertically reciprocatory piston or pitman rod 5; the windmill vane having yoke 6; and the upwardly and laterally extending arm or bracket 7 to carry the windmill shaft 8, sometimes known as the crank or driving shaft.

The upper end of bracket 7 is elongated radially of the windmill head and is laterally enlarged to provide an elongated journal box pillow 7ᵃ for the wheel shaft 8 approximately throughout the length of said shaft from the windmill hub 9 on the outer projecting end of the shaft to the hub of the crank disk 10 on the inner projecting end of said shaft. The cover for this elongated pillow and for the shaft, in this embodiment, provides a journal box cap in the form of two bearing surfaces or what for convenience in description, I herein refer to as a pair of end journal box caps 11 closing down on the opposite end portions of the shaft 8 and cooperating with the end portions of the pillow to form bearings or journal boxing for and approximately snugly receiving the end portions of the shaft with the shaft projecting therefrom, at one end to receive the windwheel located beyond one end of the pillow, and at the opposite end projecting to receive the crank disk beyond the other end of the pillow. This cover not only forms the bearing cap for the shaft but also provides a lubricant box or receptacle 12 joining the two shaft bearing portions 11, as well as horizontal side flanges 13 extending laterally from opposite sides of the caps and box to fit on the top face of the pillow and to receive the bolts 14 by which the cover is bolted to the pillow. The side flanges 13 also provide depending lugs 15 to engage the edges of the pillow and center the cover on the pillow with respect to the long bearing groove in the top face of the pillow that receives the wheel shaft with its upper side exposed to the cover.

The lubricant box 12 is formed by imperforate upstanding side walls 12$^a$ joined by imperforate upstanding edge walls 12$^b$ to form an upright box that is elongated longitudinally of the wheel shaft and is closed at the bottom by the shaft and at the top by a removable cover plate 12$^c$ having any suitable fastening or locking device 12$^d$. The alined journal box caps 11 are arranged at the exterior of the opposite ends of this box, projecting in opposite directions from the lower ends of the box edge walls 12$^b$, and the side and edge walls of the box and said caps are preferably composed of a single casting. The cover plate 12$^c$ can be composed of another casting formed to fit down and center on the top edges of the upright walls of the box. The locking device 12$^d$ is designed to clamp the cover plate on the box over the otherwise open top of the box to exclude rain and snow but not to prevent passage of air to the interior of the box, as the joint between the cover and box wall edges is designed to permit inflow of air to maintain atmospheric pressure on the grease in the box as the mass of grease descends. This fastening or locking device, in this instance, comprises a bolt extending vertically through the cover and having an exposed nut above the cover and a head below the cover to engage under ribs or shoulders 12$^e$ on the inner faces of the box side walls. The nut can be loosened to permit removal of the cover from the box and can be tightened to lock the cover in place on the box. The box preferably flares or enlarges downwardly, is interiorly unobstructed, and (except for the shaft and pillow) is entirely open at the bottom, and hence (in this particular instance) is formed with an enlarged bottom opening or outlet. The lower edges 12$^f$ of the box are formed to close down snugly on the top face of the pillow to prevent escape of lubricant at the junction between the box and pillow, and in this connection shims are preferably employed to secure the desired tight joints between the cover and pillow so that the box bottom will be grease tight.

When the cover is bolted in place on the pillow and wheel shaft, the upper side of the shaft approximately occupies the open bottom of the box and approximately constitutes the floor or bottom closure thereof and the surface of the shaft is exposed in the box to support the large body of grease in the box. This box is designed to contain a large mass of heavy lubricant, preferably so-called cup grease which is of such consistency or viscosity that it will constantly and automatically feed or settle in the unobstructed interior of the box by gravity as the mass is gradually reduced in bulk from the bottom by the action of the shaft in carrying grease into the bearings.

The longitudinal play, rotation and movement of the shaft will wear away from the bottom of the mass sufficient quantities of fresh grease to thoroughly lubricate the shaft throughout the lengths of the bearing surfaces of the pillow and end journal boxes, yet without such excess lubrication as to cause waste of lubricant from the outer ends of the journal boxes and consequent objectionable dripping, and return of worn or gritty grease from the bearing to the mass of fresh grease. Hence, I avoid the necessity of providing for a return flow of used oil, and the disadvantages incidental to the continued use of the same body of oil, that soon becomes impregnated with metal particles that will damage the bearing surfaces.

The shaft does not rotate in and stir up the entire mass of grease and consequently distribute therein particles of metal worn from the bearing, inasmuch as the shaft is located in the bottom only of the mass and the grease is carried longitudinally of the shaft into the bearings. The cover is designed to form a grease tight joint with the pillow and shims are employed if necessary to produce a tight fit and prevent grease leakage so that the only possible grease passage is through the bearings. As the grease box is thus grease tight at the bottom, the gradual wearing away of grease from the bottom of the grease mass may produce more or less minus pressure at that point so that the atmospheric pressure in the grease box above the grease mass aids in forcing the grease mass constantly down into contact with the shaft.

My lubricant box is designed for filling with a comparatively large quantity of grease, a quantity sufficient to properly lubricate the shaft for a long period of time, say for may weeks or months. The body of grease rests on and is upheld by the working member (the rotating shaft) and is constantly held thereto by gravity, presenting a surface of most extensive area against the moving surface of said member. The surface of said member moving in the bottom part of the mass of grease, slowly and gradually reduces the bulk of grease from the bottom and the mass gradually settles by its own weight, without requiring attention or adjustment, until the supply of lubricant in the box is exhausted.

In the type of windmill gearing or transmission illustrated, the crank disk 10 carries a wrist pin 17 journaled in the lower end of pitman 18, while the upper end of this pitman receives a stud shaft or wrist pin 19 fixed to and projecting laterally from the pitman bar or piston rod 5, in the open side of the vertically elongated guide 4. The rod 5 is hence reciprocated vertically by the rotation of the wheel shaft and its crank disk.

It is evident that various changes, variations and modifications might be resorted to without departing from the spirit and scope of my invention and hence I do not wish to limit myself to the exact disclosures hereof.

Desiring to protect my invention in the broadest manner legally possible, what I claim is:—

1. A heavy-grease gravity feed lubricator for windmills characterized by an upstanding normally-closed grease compartment of a capacity to contain a comparatively large mass of grease, with the moving part to be lubricated extending into and approximately occupying the bottom portion of the interior of the compartment to move in the body of grease therein, said compartment being internally formed to require the grease to rest against and freely settle down on said moving part by gravity, said compartment being closed against the weather to maintain the body of grease for a long period without replenishing and grease tight at the bottom and open for entrance of air to the top of the compartment above the grease therein.

2. A gravity feed lubricator for windmill working parts for supplying lubricant to the surfaces of a working part and the bearing therefor, comprising a grease supply compartment of large grease capacity mounted on the member providing the bearing surface and at its lower end having direct communication with said bearing surface, said compartment closed against the weather to maintain a large body of grease for a long period of time without replenishing, said working part extending into and approximately occupying the lower portion of said compartment to work directly in the mass of the grease therein, the interior of said compartment being constructed and arranged for the free downward movement of the mass of grease under its own weight to automatically maintain extensive contact of the mass of grease against said moving part for the gradual transfer of grease from said mass to said bearing surfaces by the movement of said moving part, as required for the lubrication of said surfaces.

3. In combination, a part having a bearing, a moving member working in said bearing, and an upright normally-closed grease supply box mounted on said part and at its bottom part open to said bearing, said moving member extending from said bearing into and moving in the bottom part of the interior of said box and working directly in and approximately upholding the mass of grease therein, the interior of said box being unobstructed to require the mass of grease to rest against said part and to feed freely downwardly to and against said part by gravity.

4. In combination, a part having a bearing, a moving member working in said bearing and extending beyond one end thereof, and a vertically-arranged grease supply box mounted on said part and at its lower portion enclosing said end of the bearing with said member approximately occupying the lower portion of the interior of the box to work in the mass of grease in said box and cause gradual movement of the grease from the bottom of said mass into said bearing as required for lubrication, said box being interiorly formed to require the grease to constantly rest against and freely settle down on said member by gravity.

5. In combination, a part having a bearing or journal box, a working member moving in and extending through and beyond said box, and a gravity-feed grease supply box carried by said part and having a top supply opening and having a bottom opening to one end of said bearing and receiving said working member, said member being arranged to approximately uphold the mass of grease in the box and work in the bottom portion of said mass, said mass of grease being free to settle by gravity in said box to maintain its contact with said member.

6. In combination, a part having a journal box, a working member movable in said box and extending from an end thereof, an upwardly extended gravity-feed grease supply box mounted on said part with said end of the journal box opening into the bottom part of the box interior and with said member exposed in and approximately filling said bottom part of the box to move in and approximately uphold the mass of grease therein.

7. In combination, a working member, supporting and bearing means therefor embodying a journal box, and an upright gravity-feed grease supply box having its otherwise open bottom occupied by said working member to work in and uphold the mass of grease in the box, the interior of the box being unobstructed for the free downward movement of the grease onto said member by gravity, said grease supply box forming a part of the journal box cap.

8. In combination, a pillow, a shaft thereon, and a cover for said shaft and pillow providing a journal box cap and an open-bottom upwardly-extending gravity-feed grease box integral with said cap, substantially as and for the purposes set forth.

9. In combination, a pillow, a shaft thereon, caps co-operating with said pillow to provide a pair of spaced journal boxes for said shaft, and an upright gravity-feed grease supply box secured on and rising from said pillow and arranged between said boxes with said shaft exposed in and occupying the bottom of said box to uphold the mass of grease therein.

10. In combination, a pillow, a rotary shaft thereon, and a cover for the pillow and shaft providing at its ends a pair of journal box caps for said shaft and an intervening open-bottom gravity-feed grease supply box joining said caps and at its lower edges closing against and forming grease tight joints with the pillow so that the portion of the shaft between said caps approximately forms the bottom floor of the box to uphold the grease therein, said box having a top grease receiving opening normally closed against entrance of rain and snow and open to permit entrance of air.

RODNEY H. YALE.